United States Patent [19]

Forsyth

[11] Patent Number: 5,782,307
[45] Date of Patent: Jul. 21, 1998

[54] FURROW CLOSING APPARATUS

[76] Inventor: Daniel L. Forsyth, 630 Seventh St. SE., Oelwein, Iowa 50662

[21] Appl. No.: 751,258

[22] Filed: Nov. 18, 1996

[51] Int. Cl.⁶ ................................................ A01B 49/02
[52] U.S. Cl. ............................ 172/156; 172/166; 172/196
[58] Field of Search ..................... 111/52, 123; 172/156, 172/134, 140, 166, 180, 182, 196, 201, 510, 551, 699, 701

[56] References Cited

U.S. PATENT DOCUMENTS

| | | | |
|---|---|---|---|
| 3,306,241 | 2/1967 | Copple | 172/156 X |
| 3,749,177 | 7/1973 | Keyser et al. | 172/44 |
| 5,080,178 | 1/1992 | Dietrich, Sr. | 172/196 X |
| 5,333,694 | 8/1994 | Roggenbuck et al. | 172/196 X |
| 5,452,768 | 9/1995 | Kobenlein | 172/156 X |
| 5,529,128 | 6/1996 | Peterson et al. | 172/166 X |
| 5,595,249 | 1/1997 | Steinberger et al. | 172/156 |
| 5,623,997 | 4/1997 | Rawson et al. | 172/156 |

OTHER PUBLICATIONS

Progressive Farm Products, Inc. Product Brochure—The Trash Titans (no date).

*Primary Examiner*—Terry Lee Melius
*Assistant Examiner*—Robert Pezzuto
*Attorney, Agent, or Firm*—Allan L. Harms

[57] ABSTRACT

A furrow closer for mounting to an anhydrous ammonia fertilizer applicator knife. The furrow closer has a base plate which can be selectively mounted to a mounting bracket fixed to the shank of the applicator knife. A pair of offset fluted disks lie in intersecting planes with the leading edges of the disks spaced further apart than the trailing edges. The disks are suspended of an axle which is pivotable on an axis perpendicular to the line of travel of the applicator knife.

15 Claims, 7 Drawing Sheets

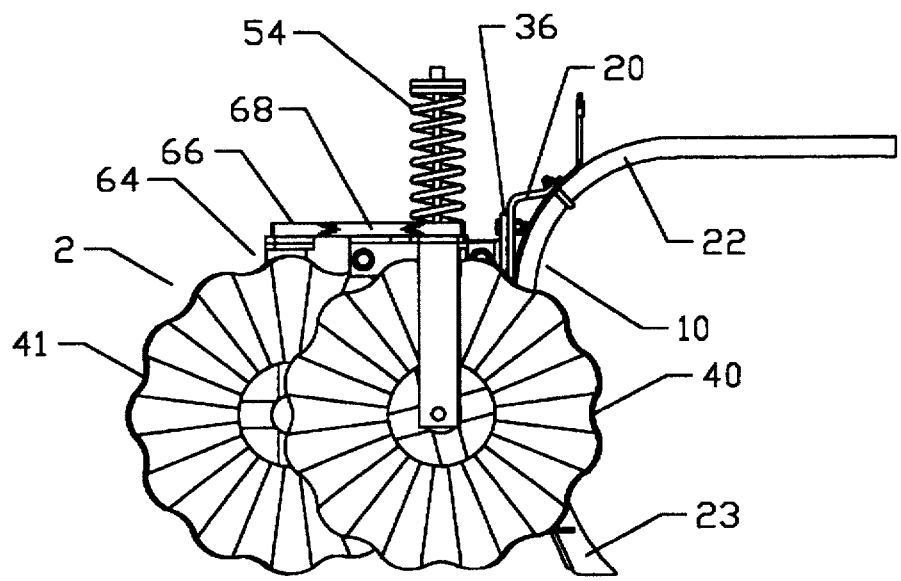
FIGURE 2
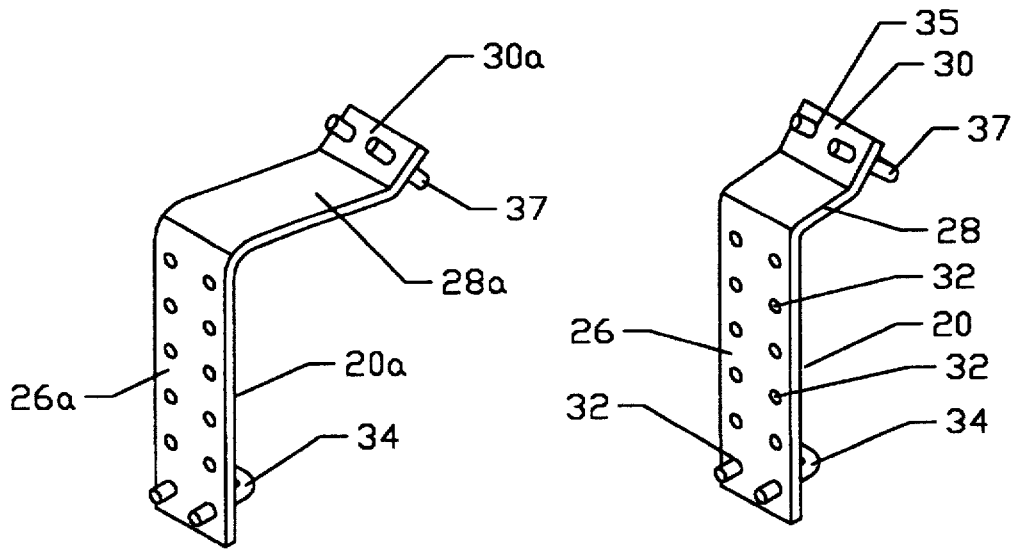
FIGURE 9
FIGURE 6

FURROW CLOSING APPARATUS

BACKGROUND OF THE INVENTION

In the agricultural industry currently there is widespread use of anhydrous ammonia ($NH_3$) as a fertilizer. The anhydrous ammonia is applied by introduction of the fertilizer into the earth immediately behind a knife or chisel which opens a furrow. The ammonia gas can escape from the furrow in the soil into which it has been introduced and early application techniques permitted this to occur resulting in a cloud of ammonia gas hovering over the field on which the anhydrous ammonia had been applied.

Later methodology developed to reduce the incidence of escape of the anhydrous ammonia fertilizer by including means to cover the anhydrous ammonia by earth. Recent methods have included traditional furrow closing devices which have been used to close the furrow into which seed has been dropped. The currently available devices include disk harrows set to follow the applicator knife on opposing sides of the furrow. Disks which are concave have been used.

The devices available for use with anhydrous ammonia application equipment provide a mounting to the shank of the knife which creates the furrow into which the anhydrous ammonia is injected. When an adjustment of the height of the furrow closing device is desired, the entire apparatus must be removed or at least loosened from its mount on the shank of the anhydrous ammonia knife. Because these knife shanks are usually curved concavely in the direction of movement of the anhydrous ammonia application implement, it is less than obvious what distance to move the furrow closer device along the curved shank to effect the desired vertical height adjustment, especially in field conditions where such adjustments are made.

Another shortcoming of present furrow closing devices employed with anhydrous ammonia application knives or other furrow opening knives is the effect of closing the furrow with a levelling device such as a harrow disk. Because the earth of the furrow has been disturbed, settling of the earth in the closed furrow may occur, leading to a trench where the furrow was made.

Additionally, in the application of anhydrous ammonia or other fertilizer in ridge till operations, where a four to six inch ridge is formed to serve as the seed bed, the furrow opening knife is directed along the middle of the seed bed ridge. The use of present furrow closing devices leads to a leveling of the soil and concomitant damage to and eventual destruction of the desired seed bed ridge.

Furthermore, with the increased emphasis on limiting tillage of farm land to lessen losses of soil from wind erosion, it is necessary that the surface debris (called "trash") from the previous crop in a no-till or minimum-till operation be efficiently moved while still successfully closing the furrow in which the fertilizer has been introduced. Prior art devices may not move the trash without being drawn through the soil at a substantial depth. Using a harrow disk at a substantial depth creates an undesired furrow in the disk's path.

Also an important consideration in the closing of the furrow into which anhydrous ammonia has been injected is the uniformity of the closing operation. Under no-till and minimum till conditions especially, there is the opportunity of the furrow closer apparatus to encounter trash, rocks, or compacted soils which cause the furrow closer to be displaced upwardly and to inadequately close the furrow when such upward displacement occurs.

Therefore, a need exists for a furrow closing apparatus which is easily adjustable on the furrow opening apparatus, which provides complete furrow closing action in varying soil conditions, which may be employed at a shallow soil depth, and which averts the leveling effects of disk harrow devices.

SUMMARY OF THE INVENTION

The present invention provides furrow closing apparatus for mounting to the curved shank of a furrow opening knife such as an anhydrous-ammonia applicator knife. The apparatus includes a mounting plate for mounting to the curved shank of the applicator knife. A base plate of the furrow closing apparatus is mountable to the mounting plate at multiple positions such that the height of the furrow closing apparatus may be easily and efficiently adjusted in a vertical direction.

The furrow closer is provided with a pair of fluted disk plates which are freely rotatable about their hubs and which are not mounted in direct opposition but instead are offset such that the hub of one disk plate is disposed in front of the hub of the other disk plate. Each disk plate is positioned in a plane offset a small angle from the plane of travel of the applicator knife such that the trailing edge of each disk plate is closer to the line of travel of the applicator knife than the leading edge of the disk plate. The disk plates are mounting on a walking axle such that the displacement of the leading disk plate in an upward direction will urge the trailing disk plate in a downward direction. The mass of the furrow closing device is increased by the use of large fluted disk plates and rugged suspending parts in order to increase the reliability of the closure of the furrow and the mounding of soil over the furrow. The use of large disk plates permits the use of the device at a shallow depth while facilitating movement of ample soil quantity to create an approximate four inch mound over the furrow and thereby to protect ridge till operations, and to lessen the potential for water erosion in channels cut by the disk plates.

Accordingly, it is an object of the invention to provide an efficient furrow closing apparatus for mounting to the shank of a furrow opening knife.

It is another object of the invention to provide a furrow closing apparatus to follow an anhydrous ammonia applicator knife which creates a mound of earth over the furrow.

It is another object of the invention to provide a furrow closing apparatus which closes the furrow made by an anhydrous ammonia fertilizer applicator knife without leaving channels in the path of the furrow closing apparatus.

It is another object of the invention to provide a furrow closing device which operates at a very shallow soil depth.

It is another object of the invention to provide a furrow closing device which efficiently closes a furrow even if rocks or hard soils are encountered by the furrow closing device.

It is yet another object of the invention to provide a furrow closing apparatus for mounting to the shank of an anhydrous application knife which can be easily and accurately adjusted for depth of penetration of the soil by the furrow closing apparatus.

The foregoing objects and others will be understood from examination of the detailed description which follows.

DESCRIPTION OF THE DRAWING FIGURES

FIG. 1 is a perspective of an anhydrous ammonia applicator apparatus being pulled by a farm tractor, the application apparatus including multiple applicator knives, each of which has a unit of the invention mounted thereto.

3

FIG. 2 is a front elevation of the preferred embodiment furrow closer mounted to the shank of an anhydrous ammonia applicator knife.

FIG. 6 is the mounting plate of the preferred embodiment furrow closer for use with an anhydrous applicator knife having a typical curved shank as depicted in FIG. 2.

FIG. 9 is an alternate form of mounting plate used to mount the preferred embodiment furrow closer to an anhydrous applicator knife shank having a spring loop therealong such as the shank depicted in FIG. 8.

DETAILED DESCRIPTION OF THE INVENTION

Figure 1:
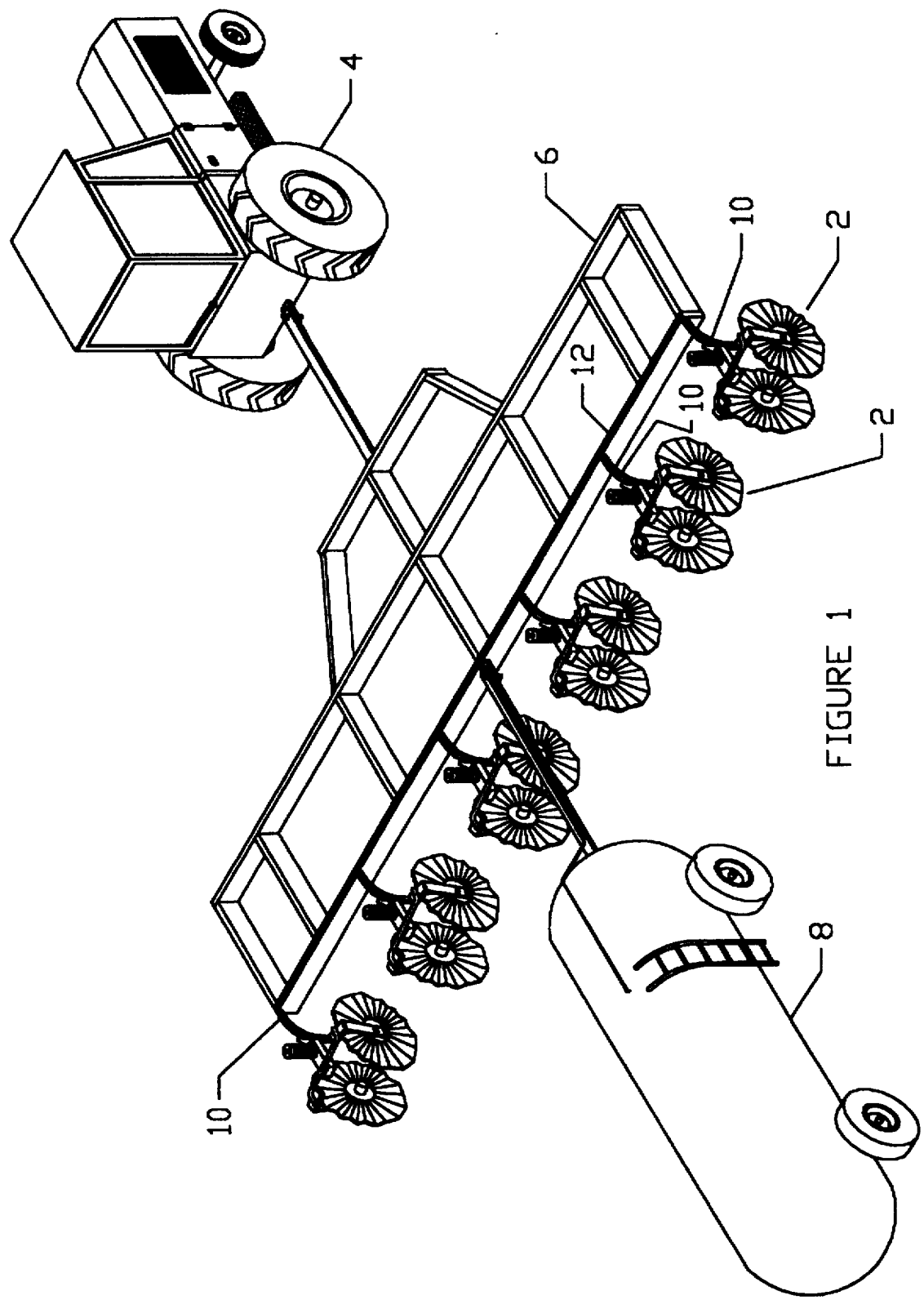

FIG. 1 discloses a typical system for application of anhydrous ammonia fertilizer into crop land wherein a farm tractor 4 tows a tool bar 6 in series with a wheeled tank 8 over land in which the fertilizer is to be introduced. The tool bar 6 is provided with multiple furrow opening knives 10 spaced apart and mounted to the trailing edge of tool bar 6. Each furrow opening knife 10 is provided with a feed tube communicative through duct 12 to the supply of ammonia in tank 8. Each furrow opening knife 10 of tool bar 6 is provided with one of furrow closer invention 2 which is mounted to the furrow opening knife 10 such that furrow closer invention 2 follows furrow opening knife 10 in its line of travel. Inventions 2 serve to close the furrow made by knives 10 as they are drawn through the soil. In addition, each invention 2 creates a small mound of earth over the furrow as it is closed by the action of invention 2.

Referring now to FIGS. 2–7, the preferred embodiment of invention 2 can be visualized in more detail. Like elements are identified throughout the drawings by identical numerals. Each invention 2 comprises mounting bracket 20 which may be fixed to the shank 22 of an furrow opening knife 10. It should be noted that mounting bracket 20 may be of slightly varying configuration to accommodate the curvature of the specific knife shank 22 to which mounting plate is to be mounted. As an illustration, FIG. 6 depicts a mounting bracket 20 for a knife shank which curves from a generally vertical to a generally horizontal direction such as the shank 22 of knife 10 of FIG. 2. Alternately, by way of further illustration, the mounting bracket 20a of FIG. 9 is configured to mount to a knife shank 22a having a less tightly curved segment at the place of mounting for mounting bracket 20a as illustrated with the knife shank 22a shown in FIG. 8 wherein knife shank 22a is provided with spring loop 23 therealong. Other geometries of knife shanks are contemplated to be encountered and the user of invention 2 need only purchase a mounting plate 22 with the proper shape to provide a secure mounting to the knife shank of the furrow opening knife to be employed.

Referring again to FIGS. 2–7, the preferred embodiment invention 2 is disclosed mounted to an furrow opening knife 10 of typical configuration. Furrow opening knife 10 comprises a shank 22 on which is mounted a tooth 23 which opens a furrow. A feed line 25 is provided along shank 22 and tooth 23 such that anhydrous ammonia gas may be passed within feed line 25 to a nozzle 27 at the lower end of feed line 25 from which anhydrous ammonia is injected into the furrow opened by tooth 23. Invention 2 includes mounting bracket 20 which comprises a substantially vertical section 26, connected integrally to a generally horizontal section 28 which has depending therefrom an upper mounting section 30. Upper mounting section 30 is provided with mounting holes 35 which may receive the ends of suitable mounting hardware such as U-shaped bolt 37 which permits upper mounting section 30 to be retained to shank 22. Vertical section 26 comprises a generally rectangular plate provided with a multiplicity of paired holes 32 therethrough. One pair of holes 32 may be utilized to mount the vertical section 26 of mounting bracket 20 to the knife shank 22 by suitable hardware such as U-bolt 34 seen in FIG. 7. Others of paired holes 32 may be selectively employed to mount base member 36 to mounting bracket 20 such that the vertical position of base member 36 may be selected by appropriate choice of mounting holes 32 of vertical section 26 of mounting bracket 20. It is important that mounting bracket 20 be mounted to knife shank 22 such that vertical section 26 of mounting bracket is substantially vertical. This allows the remaining assembly of invention 2 to be raised and lowered incrementally without removal of the mounting bracket 20 from shank 22 and without trying to raise the mounting bracket 20 along a curved shank to accomplish a desired specific vertical movement of the disks 40 and 41.

The invention furrow closer 2 comprises a mounting bracket 20 to which is fixed in a selected position the base member 36 from which extends lug 42. Lug 42 is provided with a first opening 44 horizontally therethrough which receives pivot pin 46 which pivotally mounts support member 48 to lug 42 such that support member 48 may pivot in a vertical direction over a limited range.

Support member 48 comprises a pair of spaced apart generally parallel rectangular plates 50, 51 which define generally vertical planes. Parallel plates 50 and 51 are interconnected by a brace 52 on which may be mounted coil spring 54. Coil spring 54 is provided with strut 56 which passes through the interior of coil spring 54 and is fixed at its upper end 60 to the upper end 58 of coil spring 54. The lower end 62 of strut 56 is fixed to lug 42 by means of pin 64. Support member 48 can be seen to be pivotable vertically upon base member 36 against the resistance of coil spring 54.

Coulter assembly 64 comprises a pair of spaced apart disks 40 and 41 suspended from a walking axle assembly 66. Walking axle assembly 66 includes an elongate bar 68 having an axle receiving bushing 70 fixed at generally the midpoint of elongate bar 68. Elongate bar 68 is provided with integral angled sections 72, 74 at the opposing ends thereof, angled sections 72, 74 being directed in opposing directions to form a generally shaped elongate bar 68. The intermediate section 76 of elongate bar 68 between angled sections 72, 74 is generally linear and lies in the same plane as angled sections 72, 74 of elongate bar 68. The axis of each of angled sections 72, 74 is obtuse to the axis of intermediate section 76 of elongate bar 68.

Figure 3:
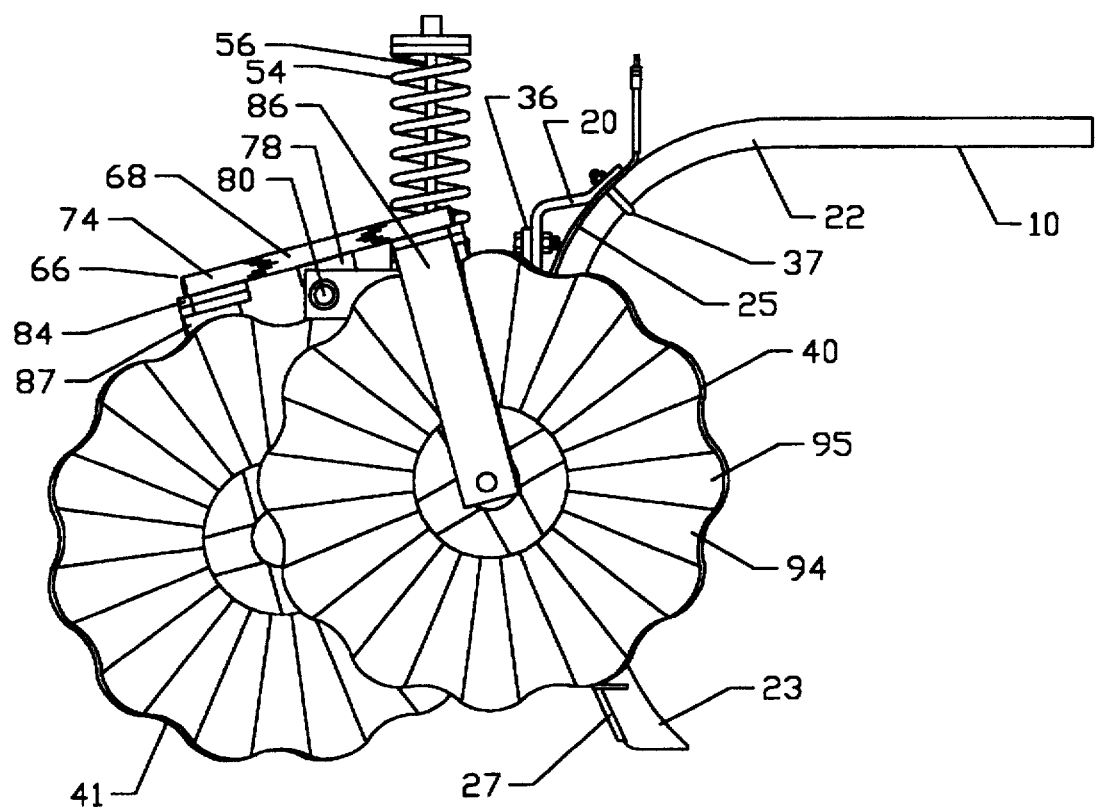
FIG. 3 is a front elevation of the preferred embodiment furrow closer illustrating the action of the invention when the leading disk plate of the invention is displaced upwardly by its encounter with embedded rocks or excessively compacted soil whereupon the trailing disk plate is urged downwardly.
Figure 4:
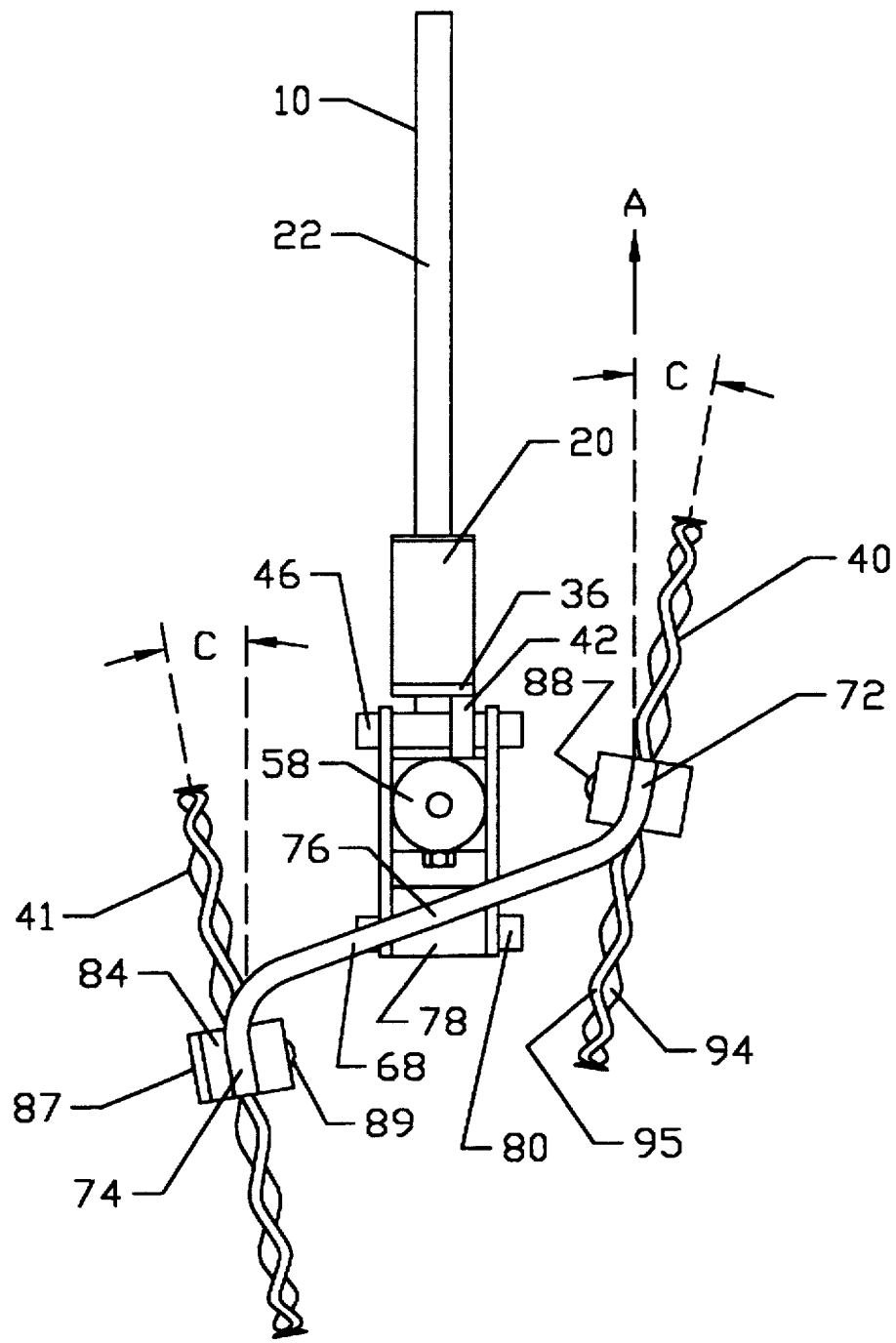
FIG. 4 is a top plan view of the preferred embodiment furrow closer mounted to an anhydrous applicator knife.
Figure 5:
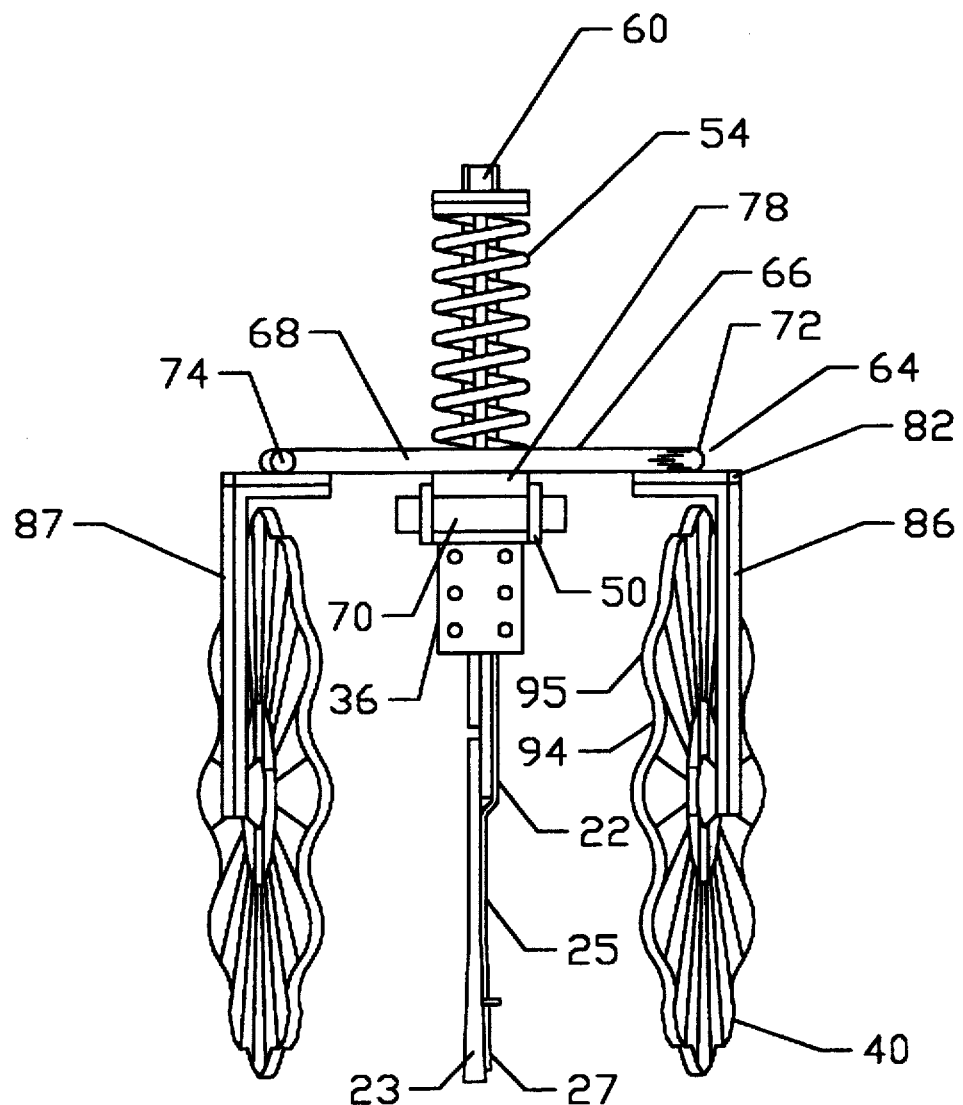
FIG. 5 is a side plan view of the preferred embodiment furrow closer mounted to an anhydrous applicator knife.
Figure 7:
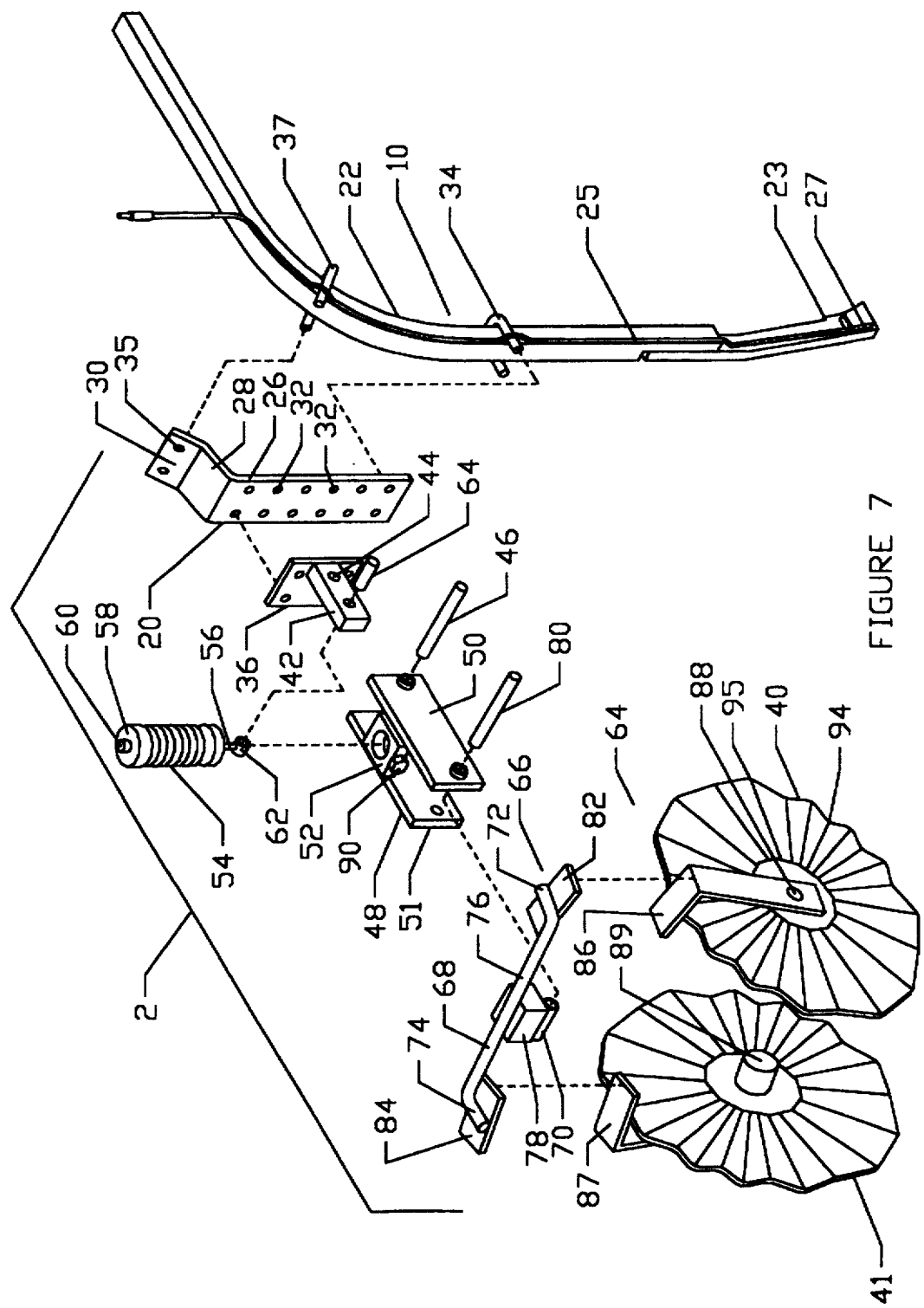
FIG. 7 is an perspective exploded view of the preferred embodiment furrow closer illustrating the individual components thereof and their interrelationships.

The axis of bushing 70 is displaced from the axis of elongated bar 68 at an acute angle, such that angled section 72 leads opposing angled section 74 in the direction of forward travel of the furrow closer invention 2 as identified by arrow A of FIG. 4. A block 78 is interposed between intermediate section 76 and bushing 70 to provide mass and appropriate spacing. It is found that welding is an appropriate mounting technique for assembly of elongate bar 68 to block 78 and block 78 to bushing 70. Each of angled sections 72, 74 is provided with mounting pad 82, 84 respectively, to which axle supporting brackets 86, 87 are mounted by bolts or by other suitable means such as welding. Axle supporting brackets 86, 87 suspend the centers of disks 40, 41 respectively at axles 88, 89 respectively, thereby allowing disks 40, 41 to rotate freely. In the preferred embodiment, disk 40 is disposed such that its hub is aligned to the leading edge of disk 41 while the hub of disk 41 is aligned to the trailing edge of disk 40. Axle pin 80 is disposed through bushing 70 when it is positioned between spaced apart plates 50, 51 such that axle pin 80 provides a pivotal attachment of coulter assembly 64 to support member 48. A stop 90 is mounted to brace 52 and serves to limit rotation of walking axle assembly 66 by abutting block 78 when trailing disk 41 is urged upwardly. When leading disk 40 is urged upwardly, walking assembly 66 may rotate about axle pin 80 into a displacement such as shown in FIG. 3. However, disks 40 and 41 and the assembly employed with them are symmetrical and balanced and therefore, walking axle assembly 66 will be urged by gravity to a rest position where hubs of each of disks 40 and 41 are at equal heights.

The angle of displacement of the axis of intermediate section 76 of elongate bar 68 from the axis of bushing 70 is chosen such that disk 40 leads disk 41 as the invention moves in the direction of travel indicated by arrow A of FIG. 4. Each of disks 40, 41 is disposed below angled sections 72 and 74 respectively such that the trailing edges of the disks 40, 41 are nearer the axis of furrow opening knife 10 than the leading edges thereof. The disks lie in intersecting planes disposed at opposing acute angles from the plane of knife 10. The planes of disks 40 and 41 intersect at an imaginary vertical line which generally intersects the furrow opened by the furrow opening knife 10. It is found that the preferable angle of deflection C from the direction of travel A of the planes defined by disks 40 and 41 is in the range from approximately 5° to 25°, preferably 10°±5°. It is further to be understood that the planes of disks 40 and 41 are each disposed generally perpendicularly to the plane defined by the surface of the ground over which the invention 2 travels. In varying application, depending on the depth or width of the furrow to be closed, disks of other diameters may be preferred, from twelve inches to thirty inches in diameter.

In the preferred embodiment, disks 40 and 41 are nominally seventeen inches in diameter having alternating flutes 94, 95 formed at the perimeters thereof, flutes 94, 95 alternately deviating from the planes of the disk 40 and 41 which are essentially planar and neither concave nor convex in overall configuration.

It is found that the weight of the furrow closer invention 2 is preferably in the range of approximately 100±10 pounds. By use of heavy duty materials of construction, the invention 2 is of sufficient mass to penetrate the soil and convey sufficient soil into and over the furrow made by the furrow opening knife 10 to close the furrow and create an approximately four-inch mound of earth over the furrow. The use of seventeen-inch diameter disks with flutes allows efficient movement of soil at a shallow soil penetration depth of about one inch, thereby avoiding the creation of side trenches created by deep penetration of the disks. Hence the lower edges of disks 40, 41 will be disposed relative to the lower end of tooth 23 such that when tooth 23 is at the proper depth for injection of $NH_3$, the lower edge of each of disks 40, 41 will be at a depth of one inch. The use of fluted disks 40, 41 increases the drag of the disks through the soil and urges the continuous rotation of disks 40, 41.

Figure 8:
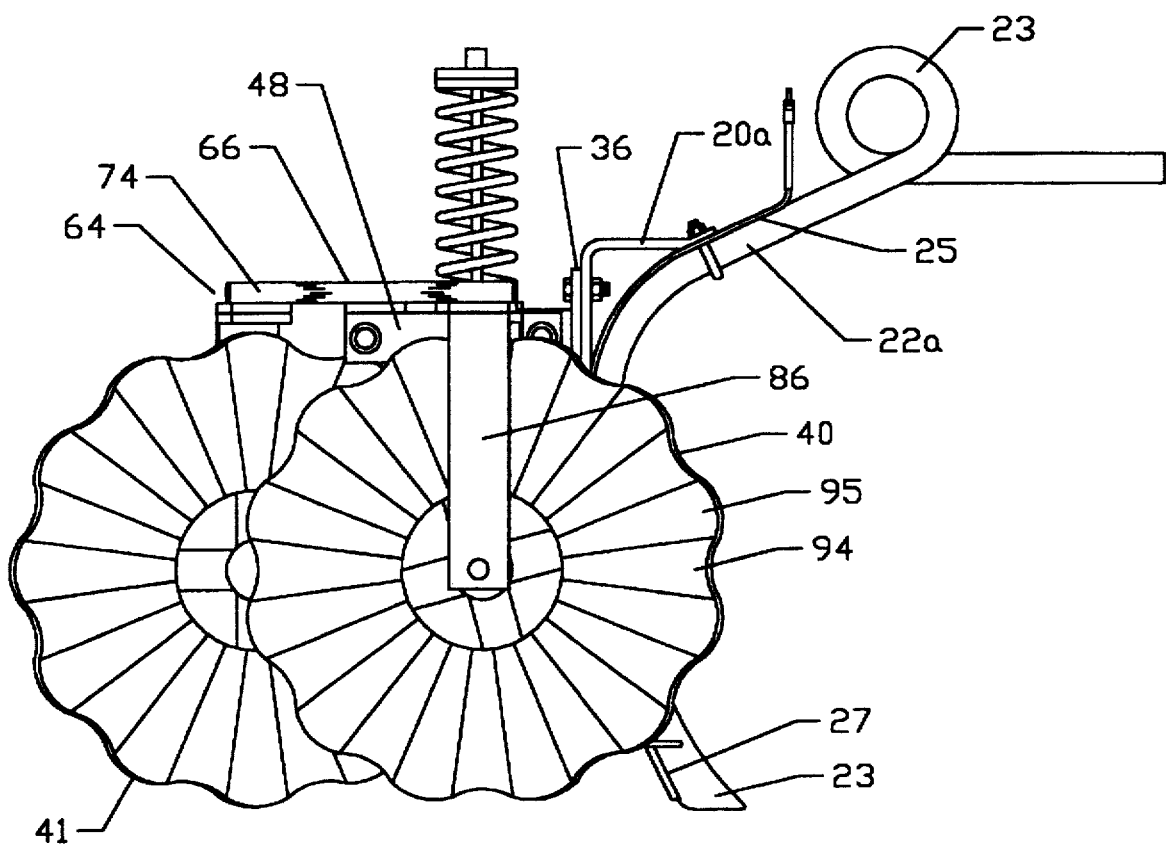
FIG. 8 is a front elevation of the preferred embodiment furrow closer mounted to an alternative model of anhydrous applicator knife having a spring loop formed along its shank.

Invention 2 may be mounted to a furrow opening knife shank with many differing configurations such as illustrated by the shank 22a of the device shown in FIG. 8 where shank 22a is provided with a spring loop 23 therealong. The use of spring loop 23 creates a different curvature of shank, leading to a requirement for an alternatively shaped mounting bracket 20a such as shown in FIG. 9. Other than for a different form of mounting bracket 20a, the remaining elements of invention 2 are identical and carry identical numeral markings as those in the other figures.

Having described the invention, I claim:

1. In a furrow closing apparatus mounted to a knife drawn in a plane of travel, the knife having a generally vertical shank, the furrow closing apparatus having a mounting member mounted to said shank and having a pair of spaced apart disks rotatably supported upon said mounting member, the improvement comprising said mounting member comprising a substantially vertically disposed mounting plate and a base plate, said mounting plate mounted to said shank, said base plate selectively mountable at a multiplicity of vertical positions thereof to said mounting plate.

2. The furrow closing apparatus of claim 1 wherein said base plate has a generally horizontal supporting arm depending therefrom, an elongate bar mounted at generally the midpoint thereof to the supporting arm, the elongate bar transversely mounted to said supporting arm, said elongate bar freely axially rotatable upon said supporting arm, said elongate bar having opposing ends thereon, each end of said elongate bar having a leg depending therefrom, each of said legs having a disk rotatably suspended thereon, each of said disks disposed generally vertically, one of said disks forward of the other of said disks.

3. The furrow closing apparatus of claim 2 wherein said axial rotation of said elongate bar is limited by a stop member.

4. The furrow closing apparatus of claim 2 wherein said elongate bar comprises an intermediate linear section having opposing ends, each of said opposing ends of said linear section having an angled segment extending therefrom, a first of said angled segments directed generally in the direction said knife is drawn, the other of said angled segments directed generally reverse of the direction said knife is drawn, a first of said legs depending from said first angled segment of said elongate bar and the other of said legs depending from said other of said angled segments of said elongate bar.

5. The furrow closing apparatus of claim 2 wherein each of said disks has a leading edge, a trailing edge and a central hub, the leading edge of said first of said disks is disposed opposite the hub of said other of said disks.

6. The furrow closing apparatus of claim 2 wherein a plane defined by a first of said disks intersects a plane defined by the other of said disks, the intersection of said planes defined by said disks being generally vertical and disposed behind said knife as said knife is drawn in said plane of travel.

7. The furrow closing apparatus of claim 6 wherein
each of said planes defined by said disks is displaced in the range of 5° to 25° from the plane of travel of said knife.

8. Apparatus to close a furrow created by a knife drawn in a plane of travel through soil, the knife having a curved shank with a tooth depending therefrom, comprising
a mounting member mountable to the shank of the knife,
a supporting arm depending from said mounting member,
an axle member transversely mounted to said supporting arm,
said axle member having an axis disposed generally transversely to the plane of travel of said knife,
said axle member partially rotatable about the axis thereof,
a bar member fixed to said axle member,
said bar member having an axis disposed generally transversely to the plane of travel of said knife,
said axis of said bar member spaced apart from said axis of said axle member,
said bar member revolvable over a limited range about he axis of said axle member,
said bar member having a pair of spaced apart legs depending therefrom,
each of said legs having a disk rotatably mounted thereto,
each of said disks having a central axle therein,
each of said disks rotatable about the central axle thereof,
each of the central axles of said disks is disposed generally horizontally,
a first of said disks disposed forward of the other of said disks.

9. Closing apparatus for urging soil into a longitudinal trench formed by a knife drawn through soil, the knife having a shank, comprising
a mounting member mountable to the shank of the knife,
a supporting arm depending rearwardly from said mounting member,
an elongate bar member supported upon said supporting arm,
said bar member having opposing ends thereon,
said bar member having an axis disposed generally transversely to said trench,
said bar member rotatable about the axis thereof,
said bar member having a pair of spaced apart legs depending therefrom,
each of said legs having a disk rotatably mounted thereto,
each of said disks being disposed generally vertically,
a first of said disks disposed forward of the other of said disks,
whereby when said first of said disks is urged upwardly, said other of said disks is correspondingly urged downwardly.

10. The closing apparatus of claim 9 wherein
each of said disks has a central hub and a leading edge,
the leading edge of said first of said disks is disposed opposing the hub of the other of said disks.

11. The closing apparatus of claim 9 wherein
said mounting member comprises a mounting plate and a base plate,
said mounting plate is mounted to said shank,
said base plate is selectively mountable to said mounting plate at a multiplicity of vertical positions.

12. The closing apparatus of claim 11 wherein
said supporting arm is fixed to said base plate,
said supporting arm comprises a bracket member and an elongate lug,
said bracket member is pivotally mounted to said elongate lug,
said bar member supported upon said bracket member and rotatable thereon,
a spring is disposed between said elongate lug and said bracket member to restrain pivot of said bracket member upon said elongate lug.

13. The closing apparatus of claim 9 wherein
each of said disks has a leading edge and trailing edge,
the trailing edge of each of said disks is disposed nearer said trench than the leading edge of each of said disks.

14. The apparatus of claim wherein
said first of said disks defines a plane which intersects a plane defined by said other of said disks, said intersection of said planes defining a substantially vertical line which when extended passes through said trench.

15. The apparatus of claim 9 wherein
said axial rotation of said bar member is limited by a stop member.

* * * * *